United States Patent Office 3,052,551
Patented Sept. 4, 1962

3,052,551
MEAT TENDERIZATION PROCESS
John M. Hogan, Oak Lawn, Ill., assignor to Swift & Company, Chicago, Ill., a corporation of Illinois
No Drawing. Filed May 22, 1961, Ser. No. 111,467
7 Claims. (Cl. 99—107)

This invention relates to an improvement in meat tenderization methods and, more particularly, to the ante-mortem enzyme injection technique.

A significant advance in the meat processing industry providing substantial benefits both to meat packers and consumers is the recently developed ante-mortem enzyme injection method. This process is disclosed and claimed in U.S. Patent No. 2,903,362, issued September 8, 1959. In accordance with the process disclosed in this aforementioned application, a solution of a proteolytic enzyme is introduced into the vascular system of a living animal, such as livestock, and the animal is slaughtered after holding for a period of time sufficient to attain distribution of the enzyme to muscle tissues. Meat cuts derived from animals injected in this manner are very tender and exhibit good textural properties.

While this process has been very successful in providing meat products of improved tenderness when cooked and provides substantial advantages over prior meat tenderizing methods, it has now been discovered that further and important benefits are obtained by the method of the instant invention. Advantages provided by the present method include increased uniformity of tenderness between cuts such as steaks and roasts and a decrease in the number and severity of adverse physiological reactions in the animal being treated.

It is, therefore, an object of this invention to provide an improved method for the ante-mortem injection of livestock with proteolytic enzymes to insure a greater uniformity of tenderness between roasts and steaks derived from a given animal.

Another object is the provision of a method for introducing proteolytic enzymes into the vascular system of a living animal under conditions which insure that the condition of the live animal, the viscera, and of the carcass will comply with U.S. Meat Inspection Division inspection requirements.

Additional objects, if not specifically set forth herein, will be readily apparent to one skilled in the art from the following detailed description of the invention:

In accordance with this invention, improved results with respect to a high degree of tenderization while maintaining good texture of the meat product are obtained by injecting a stabilized and/or purified enzyme solution into the animal being treated. It has been found that commercial enzyme preparations contain materials which give rise to some side reactions, in some cases in the form of lesions of the viscera and carcass lymph nodes. In addition, commercial enzyme preparations contain a much smaller amount of active enzyme than is generally realized. By purification and stabilization of the enzyme preparation it is possible to prepare a reversibly inactivated enzyme solution exhibiting a much higher enzyme activity upon reactivation, with a substantially reduced propensity toward damage of certain organs of the animal. Enzymes which may be employed in the method of this invention include those proteolytic enzymes which are active at the pH of the blood of a live animal and the pH of an animal carcass (pH 5.0–7.4) and which can be reversibly inactivated by oxidation. Typical enzymes falling within this grouping are bromelin, ficin, papain, some cathepsins, and milkweed proteinase among others.

By "stabilized" enzyme and "stabilization" of the enzyme we mean the enzyme product and process of preservation of the enzyme solution in a condition which will permit its injection into an animal in amounts sufficient for tenderization without causing untoward physiological reactions in the animal or lesions in the viscera and/or carcass. This preservation is accomplished by reversible inactivation of the enzyme which involves the addition of inactivating materials and/or the removal of activating materials. Thus, while in the inactive state the enzyme does not act upon itself or other substrates to produce undesirable products.

The terms "purified" enzyme and "purification" are intended to denote the enzyme product and process wherein the enzyme responsible for tenderization is rendered relatively free of impurities. This purification of the enzyme is attained by removal of inert proteins, activating compounds, and other materials from the enzyme solution.

The method of introducing a purified and/or stabilized enzyme into the vascular system of a living animal was developed in an attempt to obtain better control of the enzyme tenderizing action. Papain, for example, is relatively resistant to heat and when this enzyme is employed, most of the tenderizing action on meat occurs during cooking. The greatest tenderization occurs when there is an intimate contact between the enzyme and meat fibers at a temperature of about 150–200° F. Various types of meat cuts are traditionally cooked at different temperatures for varying lengths of time to produce cooked roasts, chops, steaks, etc. Roasts are ordinarily cooked at lower oven temperatures and for longer periods of time than steaks and chops. Because steaks and chops are cooked at relatively high temperatures, about 400–450° F., and are usually only from ½–2 inches in thickness, the major portion of the meat is quickly heated to a high temperature in a short period of time (20–30 minutes). On the other hand, roasts which are cooked at an oven temperature of about 325° F. and are generally 3–5 inches in thickness require a longer period of time (3–4 hours) for cooking to the same degree as steak. Since enzyme action and degree of tenderization are dependent upon concentration of active enzyme and time and temperature of heating, satisfactory tenderization of steaks and chops and maintenance of desirable texture of roasts have not been possible heretofore. When an animal is treated with a sufficient amount of active enzyme to provide tenderized steaks and chops, the roasts are mushy, while steaks from an animal treated with the appropriate amount of enzyme to provide tenderized roasts having good texture are only very slightly tenderized. When an animal is treated with stabilized and/or purified enzyme, the resulting steaks are desirably tender and the roasts are likewise so without displaying loss of desirable texture. Thus a more uniform desirable overall tenderizing action is secured.

Oxidation may be used to reversibly inactivate and allow for purification of the enzyme without producing impurities such as products of proteolysis. Reversible inactivation may be achieved by treating the enzyme with oxidizing agents such as hydrogen peroxide, iodine, oxygen, and Lugol's iodine. Reducing agents activate certain enzymes such as papain. Reactivation of the stabilized enzyme may be obtained by treating the stabilized enzyme with one of many chemical reducing agents such as cysteine, sulfhydryl compounds, ascorbic acid, and sulfides. Also chemical substances normally present in the animal system act as reducing agents. These naturally occurring reducing agents may reactivate the inactivated enzymes after injection into the animal.

In the purification and stabilization processes, the enzyme powder is taken up in a liquid such as water, the suspension is clarified, if necessary, by centrifugation or filtration, and then inactivated by treatment with hydrogen peroxide or air or other oxidizing agents. As an alternative, the solution may be purified by treatment with salt or alcohol fractionation. The pH of the treated enzyme solution is then adjusted to about pH 7.0–7.5 if necessary. Seitz filtration may optionally be employed to sterilize the solution.

The stabilized enzyme solution may be prepared by any of the known methods for reversibly inactivating enzymes, such as by aeration and the use of oxidizing agents. The following method of inactivating the enzyme involves oxidation with peroxide and removal of excess peroxide with catalase:

EXAMPLE I

Five grams of commercial papain powder is wetted with an equal amount of glycerin. The mixture is stirred to about the consistency of a paste and then taken up in about 100 ml. of distilled water containing 3% hydrogen peroxide. After this solution is permitted to stand at room temperature (20–30° C.) for 30 minutes, catalase is added in the following manner:

0.25 ml. of an aqueous solution containing 2 mg. of catalase per milliliter is added to the peroxide-papain mixture at 10-minute intervals until 1.75 ml. of the catalase solution has been added. At this point 5 grams of Hyflo-Super-Cel is stirred into the mixture and the solution clarified by filtering through a Büchner funnel. After dilution of the clarified solution five times with water, sodium chloride is added to the solution in an amount equivalent to 0.85 gram of sodium chloride to each 100 ml. of solution. After adjusting the pH to approximately 7.3 the solution is filtered through a Seitz sterilizing filter into sterilized bottles. The bottles containing the reversibly inactivated enzyme solution are refrigerated until used. At the time the enzyme solution is used, it may be necessary to adjust the pH to about 7.3.

It is, of course, possible to vary the above procedure in many ways without departing from the scope of the present invention. It might be desirable to employ air as the oxidizing agent and it might also be desirable to use alcohol fractionation or salt fractionation in purifying the enzyme prior to or following inactivation.

Inactivation of the enzyme by aeration is illustrated in the following example:

EXAMPLE II

Five grams of commercial papain powder is wetted with an equal amount of glycerin, the mixture is stirred and then taken up in 100 ml. of distilled water, centrifuged and/or filtered to clarify by removing insoluble materials. The solution of the enzyme is blended in a Waring Blendor for 1 minute, and this 1-minute blending procedure is repeated at 5-minute intervals over a period of 3 hours. The blended solution is then held for a period of at least 2 hours prior to use. This 5% solution may also be diluted three to five-fold with water, sterilized by passage through a Seitz filter, and stored from 24 hours to 3 weeks under refrigeration prior to injection. It has been found that the more dilute solutions are somewhat more desirable for the purposes of this invention since more dilute solutions have a greater stability against deterioration and the formation of breakdown products upon storage. While this improved shelf-life of the enzyme solution is a desirable characteristic, apparently emanating from the dilution effect, this advantage is counterbalanced by the fact that the more dilute the solution the greater will be the volume of solution that must be injected into a given animal to provide the required dose. Several animals have been treated with a 1% solution of the enzyme and the meat cuts derived from such animals are satisfactorily tenderized although it is necessary in the case of large animals to use substantial volumes of the enzyme solution in order to obtain adequate dosage. In some cases volumes of around 2.5 liters of the enzyme solution must be injected into the animal. A 5% solution of the enzyme, on the other hand, may be much more conveniently used since only about 500 ml. of the 5% solution are required to inject the average animal with a desirable amount, i.e., about 35 mg. of enzyme per pound of live weight.

Stabilized and/or purified enzyme solutions containing 1–10% by weight of the enzyme have been employed satisfactorily in injecting large meat-bearing animals.

The following is a salt fractionation procedure for preparing the preferred purified enzyme composition:

EXAMPLE III

In this work 5 grams of commerically available papain powder is mixed with 5 grams of C.P. glycerin and the mixture is stirred to about the consistency of a paste. The paste is stirred into 200 ml. of water and the resulting solution is clarified by filtration or centrifugation. The clarified extract is then diluted with 300 ml. of water, and 150 grams of sodium chloride are added. The pH of the saline solution is adjusted to pH 3.5 and the enzyme precipitates out of solution. After filtration or centrifugation to separate the salted out enzyme from the solution, the precipitate is dissolved in 100 ml. of water adjusted to pH 7.4. After sterilization the solution is refrigerated and stored under refrigeration prior to use.

The salt fractionated enzyme prepared above may be protected against deterioration by the addition of sufficient hydrogen peroxide to provide a concentration equivalent to 7 ml. or less of 30% hydrogen peroxide per liter.

The salt fractionation technique for purifying the enzyme may be modified by preparing the original suspension of the enzyme in dilute (10% or less) hydrogen peroxide rather than water. If this substitute procedure is followed, an additional small quantity of hydrogen peroxide may be added to the solution of the salted out enzyme.

While sodium chloride has been employed as the salt for fractionation in the preceding example, it is apparent that other salts suitable for use in enzyme fractionating procedures can also be employed. The alkali metal and ammonium phosphates and sulfates, as well as chlorides, can be substituted for sodium chloride with varying degrees of efficiency. Generally, the salt which is employed in the salt fractionation procedure should be one which causes the enzyme to precipitate from solution and should be a salt which is relatively nontoxic so as to insure that toxicity problems will not be introduced if any of the salt remains in the enzyme composition.

The volume of solution to be injected into a given animal depends upon the concentration of the solution and the weight, grade, and class of the animal. Quantities of enzyme as low as 0.1 mg. per pound and as high as 120 mg. per pound may be employed to obtain the tenderization. On cattle and sheep, a desirable dosage range is 10–150 mg. per pound, and the preferred dosage range is 25–100 mg. of enzyme per pound as supplied by a 1–10% solution injected intravenously. If other methods of introducing the enzyme are employed, it may be necessary to adjust the dosage and concentration to compensate for such procedures. This quantity is calculated on the basis of the amount of commercial powder employed in preparing the solution. In the preferred embodiment of the invention, about 2 to 5 minutes is required to inject the desired amount of the purified solution into the animal, and the animal is then held for 6 to 15 minutes before slaughter to give adequate distribution of the enzyme to all portions of the carcass and provide desirable control of the enzyme tenderizing action, i.e., uniformity of tenderization between roasts and steaks or chops. Longer periods of time around 1–3 hours may be allowed between completion of the injection and slaughter of the animal, although after about 24 hours the tenderization effect is not noted unless a large dose of enzyme is employed. In many operations where the arrangement of facilities permits, slaughtering of the animals usually takes place within about thirty minutes after completion of the injection.

In order to demonstrate the advantages in the texture of the meat products and the inhibition of adverse physiological reactions provided by the stabilized and/or purified enzyme preparations, these stabilized and purified preparations were compared with untreated enzyme preparations by injection into ewes, and the animals were observed for physiological reactions and the carcasses were inspected for lesions. A panel of experts rated the meat cuts for tenderness and texture. The enzyme solutions were prepared as follows:

| Enzyme solution | Preparation |
|---|---|
| (1) Commercial | 5 gm. of papain powder is wetted with C.P. glycerin and the mixture diluted with 100 ml. of water. The pH of the suspension is adjusted to pH 7.4 and the solution is clarified by filtration. This solution is injected at a level of 0.7 ml./pound of the animal weight. |
| (2) Stabilized | This solution is prepared in the same manner as that described above for the commercial enzyme solution with an additional step of adding 0.7 ml. of hydrogen peroxide (30%) to the water solution of the enzyme. Dosage here, as with the commercial solution, is at the level of 0.7 ml. of the enzyme solution/pound of the animal weight. |
| (3) Purified | This solution is prepared in accordance with Example III set out above. The dosage is at the rate of 0.7 ml. of the enzyme solution/ pound of the animal weight |
| (4) Stabilized and purified | The solution is prepared exactly as that set forth for the purified solution noted above and 0.7 ml. of 30% hydrogen peroxide/100 ml. of solution is added to the final solution prior to Seitz filtration. This solution, like the others in this comparison, was injected into the animal at a dosage of 0.7 ml./pound of animal weight. |

(The above noted doses of 0.7 ml./pound animal weight are equivalent to 35 mg./pound animal weight.)

These solutions were injected into the jugular vein of ewes in the dosages noted to provide 35 mg. of the enzyme per pound of live weight of the animal. Three animals were employed for each treatment. Slaughter of the animals occurred around 5–20 minutes after completion of the injection. Inspection of the carcasses resulted in the following tabulated observations:

| Solution | Physiological Reaction | Lesions |
|---|---|---|
| 1. Commerical | Depression, dyspnea, lacrimaation, and salivation. | Subendocardial and myocardial hemorrhage, hyperemia of liver, spleen, lungs, and lymph nodes. Slight to marked edema of laryngeal and pharyngeal areas and alveolar edema. |
| 2. Stabilized | None | Slight edema of laryngeal and pharyngeal areas. |
| 3. Purified | None | None. |
| 4. Stabilized and Purified | None | None. |

After dressing the carcasses, roasts and chops from each were cooked at conventional cooking temperatures and times and the cooked cuts were rated for tenderness and texture by a panel of experts composed of at least four persons. The following data illustrate the results obtained from the treatment of three animals with each of the above-noted enzyme solutions as compared to a control which had not been so treated:

| Solution | No. of Sheep | Roasts | | Chops | |
|---|---|---|---|---|---|
| | | Tenderness | Texture | Tenderness | Texture |
| 1. Commercial | 3 | 10.0 | 1.0 | 9.1 | 9.0 |
| 2. Stabilized | 3 | 9.5 | 7.5 | 8.7 | 9.3 |
| 3. Purified | 3 | 9.5 | 5.8 | 9.2 | 8.2 |
| 4. Stabilized and purified | 3 | 8.2 | 8.2 | 8.3 | 9.1 |
| 5. Control | 3 | 6.4 | 7.6 | 7.0 | 8.8 |

The scale setting forth the significances of the values given for tenderness and texture is as follows:

| Quality rating: | Numerical rating |
|---|---|
| Excellent | 10 |
| Good— | |
| + | 9 |
| 0 | 8 |
| − | 7 |
| Fair— | |
| + | 6 |
| 0 | 5 |
| − | 4 |
| Poor— | |
| + | 3 |
| − | 2 |
| Unsatisfactory | 1 |

In all cases the meat derived from the treated animals was more tender than that of the control cuts. Stabilization of the commercial enzyme or purification by salt fractionation or a combination of stabilization and salt fractionation provided a greatly improved texture while maintaining improved tenderness.

Heifers were treated with a stabilized and purified solution in the same manner as noted above, the dosage being at the 45 mg./pound level, to produce tenderized products with the carcasses exhibiting substantial freedom from lesions. Thirty-five grade cows were injected with the stabilized and purified solution at the 100 mg./pound level with similar desirable results.

Alcohol fractionation also provides a purified enzyme composition. Purification by alcohol fractionation may be attained in accordance with the following method:

EXAMPLE IV

Five grams of commercially available papain powder is suspended in 100 ml. water and the solution is centrifuged to remove impurities. Ethyl alcohol is added to the clarified liquid in an amount sufficient to provide a concentration of 85% ethanol. The active enzyme precipitates from the 85% ethanol solution and after cooling to 0° C. the solution is centrifuged to separate the active enzyme from the alcohol solution of impurities. The precipitate is collected and dissolved in 500 ml. $H_2O$ and the pH is adjusted to 7.4. After filtration through a Seitz sterilizing filter, the enzyme solution is stored at refrigeration temperatures.

Solvents other than ethanol which can be employed in the solvent fractionation procedure include water-miscible, lower aliphatic alcohols and water-miscible lower aliphatic ketones. These solvents which serve to permit separation of impurities from the enzyme by solubility differences are generally low boiling (below about 125° C.) liquids. Typical solvents of this group include methanol, ethanol, propanol, isopropanol, methyl ethyl ketone, dioxane, ethyleneglycol, tertiary butyl alcohol and methyl Cellosolve. Acetone has been found very well suited to use in the process of the invention since this solvent removes many of the impurities often present in crude enzyme preparation which promote adverse physiological reactions in animals. Acetone fractionation and the use of the acetone fractionated enzyme in the process is accomplished as follows:

EXAMPLE V 60 grams of commercially available milled papain powder is mixed with 60 grams of C.P. glycerine. The ingredients are mixed until a paste is formed and the resulting paste is taken up in 1,200 milliliters of distilled water, cooled to 10° C. The paste-water mixture is vigorously agitated and the solution which results is clarified by filtration. The clarified solution is then mixed with 3,000 milliliters of acetone, cooled to 10° C. The acetone-water mixture is thoroughly agitated and purified enzyme precipitates from the liquid. 120 grams of Hyflo Super-Cel or other filter aid is added and the precipitate is collected by filtration. The filter cake is treated with 500 milliliters of water and the mixture is again filtered. The pH of the filtrate is adjusted to pH 7.4 and diluted to 1200 milliliters with water. Ten grams of sodium chloride is dissolved in the enzyme solution and the solution is sterilized by filtration through a bacteria-retentive Seitz pad.

The sterilized solution was injected into the vascular system of mature sheep at the rate of 0.7 milliliter of the enzyme solution/lb. of animal weight. There were no physiological reactions in the animal and no lesions in the carcasses after slaughter. The roasts and chops from the carcasses after dressing were cooked at conventional cooking temperatures and times and the cooked cuts were rated for tenderness and texture by a panel of experts composed of at least four persons. The tenderness rating of the roasts was 9.4 while texture was rated at 6.0. The tenderness of the chops is 9.6 while the texture is 9.3. These results are compared with the results obtained in treating sheep with the commercial enzyme as noted previously.

Alcohol fractionation combined with stabilization may be achieved as follows:

EXAMPLE VI

In this case 5 grams of commercially available papain powder is suspended in 100 ml. water containing 3% hydrogen peroxide. The insoluble portion of the enzyme preparation is removed by centrifugation and the clarified supernatant liquid is treated with 1.75 ml. of an aqueous solution of catalase (concentration 2 g./liter) to remove excess hydrogen peroxide. Sufficient ethyl alcohol is added to the enzyme solution to provide a 55% ethanol solution. The peroxide treated active enzyme is insoluble in 55% ethanol and precipitates out. After cooling the solution to about 0° C. to insure completion of precipitation the solution is centrifuged to separate the solid enzyme from the solution of impurities. After pouring off the supernatant liquid the solid enzyme remaining is dissolved in 33 ml. H$_2$O. The pH of the aqueous solution is adjusted to pH 7.4 and the solution is sterilized by passing through a Seitz sterilizing filter.

The alcohol fractionated preparations were employed in the injection of sheep at the 30–60 mg./lb. live weight level with good tenderization and very slight adverse physiological reactions.

A solution of commercial grade ficin is prepared in accordance with the following example:

EXAMPLE VII

Five grams of commercially available ficin powder is wetted with 5 grams of C.P. glycerin and the mixture is stirred to about the consistency of a paste. The paste is stirred into 100 ml. distilled water and clarified by filtration or centrifugation. The pH of the clarified solution is adjusted to pH 7.4 with sodium hydroxide and then filtered through a Seitz filter. The resultant commercial solution is injected into the live animal at a level of 0.25 ml./lb. of the animal weight. This dosage provides about 12.5 mg. enzyme/pound based on the weight of the commercial enzyme powder from which it was prepared.

EXAMPLE VIII

The stabilized ficin solution is prepared in the same manner as that described above for the commercial enzyme solution with the additional step of adding 0.7 ml. of hydrogen peroxide (30%) to the water solution of the enzyme. Dosage here, as with the commercial solution, is at the level of 0.25 ml. of the enzyme solution/pound of the animal weight.

EXAMPLE IX

A purified ficin solution is prepared by wetting 5 grams of commercial ficin powder with 5 grams of C.P. glycerin and suspending the resulting paste in 100 ml. of distilled water. After clarifying the suspension by filtration or centrifugation, 30 grams of sodium chloride is added and the pH of the solution is adjusted to pH 3.5 with hydrochloric acid. The precipitate which is formed is collected by filtraton and the solid is then dissolved in 100 ml. of distilled water, the solution being adjusted to pH 7.4 with sodium hydroxide. After sterilization through a Seitz filter, the solution is injected at a level of 0.25 ml./pound live weight (12.5 mg./lb.).

The commercial grade ficin solution was compared with the purified and stabilized samples by injecting animals with the above noted dosages. The physiological reactions were as follows:

| Ficin | Physiological Reaction | Lesions |
| --- | --- | --- |
| 1. Commercial Grade | Depression, salivation, nasal congestion. | Edema of larynx, hemorrhage of stomach. |
| 2. Stabilized with hydrogen peroxide | Slight depression, slight dyspnea. | None. |
| 3. Purified by salt fractionation | None | None. |

A commercial grade of bromelin powder was made up in both the purified form and a stabilized and purified form and these preparations were compared with a solution of the crude enzyme in so far as physiological reaction in the animal is concerned.

EXAMPLE X

Five grams of commercial grade bromelin powder is wetted with 5 grams of C.P. glycerin and the mixture is stirred to about the consistency of a paste. The paste is stirred into 100 ml. distilled water and the solution is clarified by filtration or centrifugation. After adjusting the pH of the solution to pH 7.4 with sodium hydroxide, the solution is sterilized by filtration through a Seitz filter. The solution is injected at a level of 1.5 ml./pound of the animal weight. This dosage provides about 75 mg. enzyme/pound based on the weight of the commercial enzyme powder from which it was prepared.

EXAMPLE XI

A purified bromelin solution is prepared by wetting 5 grams of commercial bromelin powder with 5 grams of C.P. glycerin and suspending the resulting paste in 100 ml. distilled water. After clarifying the suspension by filtration or centrifugation, 30 grams of sodium chloride is added and the pH is adjusted to pH 3.5 with hydrochloric acid. The resulting precipitate is collected by filtration and the solid is then dissolved in 100 ml. of distilled water, the solution being adjusted to pH 7.4 with sodium hydroxide. After sterilization through a Seitz filter, the solution is injected at the level of 1.5 ml. per pound live weight (75 mg./lb.).

EXAMPLE XII

A purified and stabilized bromelin solution is prepared in the same fashion as that set forth for the purified solution in Example XI above except that 0.2 ml. of 30% hydrogen peroxide was added to the solution adjusted to pH 7.4 just prior to Seitz filtration. The following is a tabulation of the physiological reaction of the animals to the injection of these enzyme solutions:

| Bromelin | Physiological Reaction | Lesions |
| --- | --- | --- |
| 1. Commercial grade | Depression, dyspnea, nasal congestion, salivation, defecation. | Hyperemia of fascia, hyperemia and hemorrhage of lungs, hyperemia of mediastinal lymph nodes, marked edema of larynx. |
| 2. Stabilized by salt fractionation. | Slight depression, slight nasal discharge. | None. |
| 3. Stabilized and purified by salt fractionation and peroxide stabilization. | None. | None. |

Important variations which can be employed to obtain the benefits of the invention where the enzyme is of low quality requiring substantial purification include the use of mixtures of salt fractionated enzymes and solvent fractionated enzymes. Thus a blend of acetone fractionated enzyme and sodium chloride fractionated enzyme can be employed to obtain superior results. It may also be desirable to further treat an acetone fractionated enzyme with salt to further enhance the solvent fractionation.

This application is a continuation in part of my co-pending application Serial Number 749,073, filed July 17, 1958, now abandoned.

Obviously many modifications and variations of the invention as hereinbefore set forth may be made without departing from the spirit and scope thereof, and therefore only such limitations should be imposed as are indicated in the appended claims.

I claim:
1. In a method for improving the tenderness of meat while insuring uniform tenderness and texture between roasts and steaks and chops derived from a meat-bearing livestock animal, the steps comprising: introducing a solution of a proteolytic enzyme which has been reversibly inactivated by oxidation into a living animal in an amount of about 0.1–150 mg. of enzyme per pound of animal weight and slaughtering said animal within about 24 hours.

2. In a method for improving the tenderness of meat while insuring substantially uniform tenderness of texture between roasts and steaks and chops derived from a meat-bearing livestock animal, the steps comprising: introducing a solution of a proteolytic enzyme which has been subjected to purification by salt fractionation into a living animal in an amount of about 0.1–150 mg. of enzyme per pound of animal weight and slaughtering said animal within about 24 hours.

3. In a method for improving the tenderness of meat while insuring substantially uniform tenderness and texture between roasts and steaks and chops derived from a meat-bearing livestock animal, the steps comprising: introducing a solution of a proteolytic enzyme which has been subjected to purification by alcohol fractionation into a living animal in an amount of about 0.1–150 mg. of enzyme per pound of animal weight and slaughtering said animal within about 24 hours.

4. In a method for improving the tenderness of meat while insuring substantially uniform tenderness and texture between roasts and steaks and chops derived from a meat-bearing livestock animal, the steps comprising: introducing a solution of a proteolytic enzyme which has been reversibly inactivated by oxidation into a living animal in an amount of about 0.1–150 mg. of enzyme per pound of animal weight and slaughtering said animal within about 30 minutes.

5. In a method for improving the tenderness of meat while insuring uniform tenderness and texture between roast and steaks and chops derived from a meat-bearing livestock animal, the steps comprising: introducing a solution of a proteolytic enzyme which has been subjected to purification by fractionation with a water-miscible organic solvent selected from the group consisting of lower aliphatic alcohols and lower aliphatic ketones into a living animal in an amount sufficient to provide about 0.1–150 mg. of enzyme per pound of animal weight and slaughtering said animal within about 24 hours.

6. In a method for improving the tenderness of meat while insuring uniform tenderness and texture between roasts and steaks and chops derived from a meat-bearing livestock animal, the steps comprising: introducing a solution of a proteolytic enzyme which has been subjected to purification by fractionation with acetone into a living animal in an amount sufficient to provide about 0.1–150 milligrams of enzyme per pound of animal weight and slaughtering said animal within about 24 hours.

7. In a method for improving the tenderness of meat while insuring substantially uniform tenderness and texture between roasts and steaks and chops derived from a meat-bearing livestock animal, the steps comprising: introducing a solution of a proteolytic enzyme which has been subjected to purification by fractionation with dioxane into a living animal in an amount of about 0.1–150 mg. of enzyme per pound of animal weight and slaughtering said animal within about 24 hours.

References Cited in the file of this patent

UNITED STATES PATENTS

| | | |
| --- | --- | --- |
| 2,043,392 | Paddock et al. | June 9, 1936 |
| 2,240,518 | Ramsbottom | May 6, 1941 |
| 2,321,623 | Ramsbottom et al. | June 15, 1943 |
| 2,786,768 | Deatherage | Mar. 26, 1957 |
| 2,903,362 | Beuk et al. | Sept. 8, 1959 |